United States Patent
Tsai et al.

(10) Patent No.: US 9,897,142 B1
(45) Date of Patent: Feb. 20, 2018

(54) LINEAR SLIDE WITH DUST PROTECTION PLATE

(71) Applicant: HIWIN TECHNOLOGY CORP, Taichung (TW)

(72) Inventors: Yu-Wen Tsai, Taichung (TW); Sheng-Hsiang Huang, Taichung (TW)

(73) Assignee: HIWIN TECHNOLOGIES CORP, Taichung (TW)

( * ) Notice: Subject to any disclaimer, the term of this patent is extended or adjusted under 35 U.S.C. 154(b) by 0 days.

(21) Appl. No.: 15/428,163

(22) Filed: Feb. 9, 2017

(51) Int. Cl.
 F16C 29/08 (2006.01)
 F16C 29/06 (2006.01)
 F16C 33/78 (2006.01)
 F16C 33/76 (2006.01)

(52) U.S. Cl.
 CPC ........ F16C 29/086 (2013.01); F16C 29/0645 (2013.01); F16C 33/76 (2013.01); F16C 33/785 (2013.01)

(58) Field of Classification Search
 CPC  F16C 29/086; F16C 29/0645; F16C 29/0669; F16C 33/74; F16C 33/76
 USPC ................ 384/15, 42, 45, 49; 277/351, 395, 277/567–568
 See application file for complete search history.

(56) References Cited

U.S. PATENT DOCUMENTS

| | | | | |
|---|---|---|---|---|
| 5,556,206 A | * | 9/1996 | Bigwood | F16C 29/0633 384/15 |
| 6,106,154 A | * | 8/2000 | Agari | F16C 29/065 384/13 |
| 7,736,059 B2 | * | 6/2010 | Chen | F16C 29/086 384/15 |
| 8,403,562 B2 | * | 3/2013 | Geka | F16C 29/086 384/13 |
| 8,696,204 B2 | * | 4/2014 | Ooga | F16C 29/086 277/345 |
| 2008/0232725 A1 | * | 9/2008 | Chen | F16C 29/086 384/42 |
| 2008/0247688 A1 | * | 10/2008 | Hung | F16C 29/086 384/15 |

* cited by examiner

*Primary Examiner* — Marcus Charles
(74) *Attorney, Agent, or Firm* — Leong C. Lei

(57) ABSTRACT

A linear slide includes: a rail; a slide block, which is mounted on the rail and is movable relative to the rail; a plurality of rolling elements, which are arranged between the rail and the slide block; two end caps, which are respectively mounted to two ends of the slide block, the end caps each comprising a mounting trough formed therein to correspond to and face the rail, the mounting trough having a wall; and two dust protection plates, each of which is arranged in each of the mounting troughs, each of the dust protection plates comprising a main body and two elastic sections projecting from two opposite sides of the main body such that one of the elastic sections is in contact engagement with the wall and the other one of the elastic sections is engageable with a surface of the rail.

5 Claims, 8 Drawing Sheets

LINEAR SLIDE WITH DUST PROTECTION PLATE

TECHNICAL FIELD OF THE INVENTION

The present invention relates generally to a linear slide, and more particularly to a linear slide comprising a dust protection plate.

DESCRIPTION OF THE PRIOR ART

Referring to FIGS. 6 and 7, a known dust protection plate (10) comprises two metal plates (11, 12) sandwiching therebetween a left wiper plate (14) and a right wiper plate (15), which are flexible and are respectively arranged at a left side and a right side of a sliding channel (13). Each of the left wiper plate (14) and the right wiper plate (15) is provided with a lower flange (143, 153), an upper lip (141, 151), and a lower lip (142, 152). To use the dust protection plate (10), one such dust protection plate (10) is mounted to each of two end caps (51, 52) that are respectively attached to two ends of the slide block (50). The upper lips (141, 151) and the lower lips (142, 152) of left and right wiper plates (14, 15) are respectively received in and positioned against races (41, 42, 43, 44) formed in two side walls of the rail (40) and the lower flanges (143, 153) of the left and right wiper plates (14, 15) are positioned against left and right top faces of the rail (40). The conventional dust protection plate (10) functions to wipe out dust settling on the rail (40) during reciprocal relative movement between the slide block (50) and the rail (40) in order to prevent the dust from passing through the two end caps (10) to get into the slide block (50) and thus protecting rollers (45) circulating in the slide block (50) and the two end caps (10) from being soiled by the dust that may make the roller not roll smoothly.

However, long time use of the dust protection plate (10) may cause excessive wear of the lower flanges (143, 153), the upper lips (141, 151), and the lower lips (142, 152) of the left and right wiper plates (14, 15) and gaps may be formed between the left and right wiper plates (14, 15) and the rail (40). This requires complete removal of the entire dust protection plate (10) and replaced with a new dust protection plate (10). Machines must be shut down in the removal and replacement of the dust protection plate (10) and such an operation is very time consuming Further, the dust protection plate (10) so removed is no longer useful and must be disposed of This causes undesired waste of material. Thus, further improvement is needed for the known dust protection plate (10).

SUMMARY OF THE INVENTION

In view of the above problems, the primary objective of the present invention is to provide a linear slide that comprises a dust protection plate that automatically adjusts interference thereof with a rail.

To achieve the above objective, the present invention provides a linear slide, which comprises: a rail; a slide block, which is mounted on the rail and is movable relative to the rail; a plurality of rolling elements, which are arranged between the rail and the slide block; two end caps, which are respectively mounted to two ends of the slide block, the end caps each comprising a mounting trough formed therein to correspond to and face the rail, the mounting trough having a wall; and two dust protection plates, each of which is arranged in each of the mounting troughs, each of the dust protection plates comprising a main body and two elastic sections projecting from two opposite sides of the main body such that one of the elastic sections is in contact engagement with the wall and the other one of the elastic sections is engageable with a surface of the rail.

Preferably, the mounting troughs and the dust protection plates are of a U-shape.

Preferably, the mounting troughs are each provided with a positioning section formed therein and the dust protection plates are each provided with a positioning hole corresponding to the positioning section such that the positioning hole is fit over the positioning section.

Preferably, a plurality of ribs are formed between at least one of the elastic sections and the main body of each of the dust protection plates.

Preferably, the two end caps are each mounted to and covered by a fixing plate such that the fixing plate constrains a degree of freedom of the dust protection plate in an axial direction.

Preferably, the elastic sections of each of the dust protection plates are set in continuous and sustained contact engagement with the wall or the surface of the rail.

As such, the present invention provides a dust protection plate that comprises two elastic sections respectively in contact engagement with a wall and a surface of a rail so that the elasticity of the elastic sections help timely adjust the contact pressure between the dust protection plate and the rail. When the elastic section that is in contact with the rail gets worn, the other elastic section may still maintain elasticity that may complement any gap formed due to the wear to prevent foreign object from invading into the slide block.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
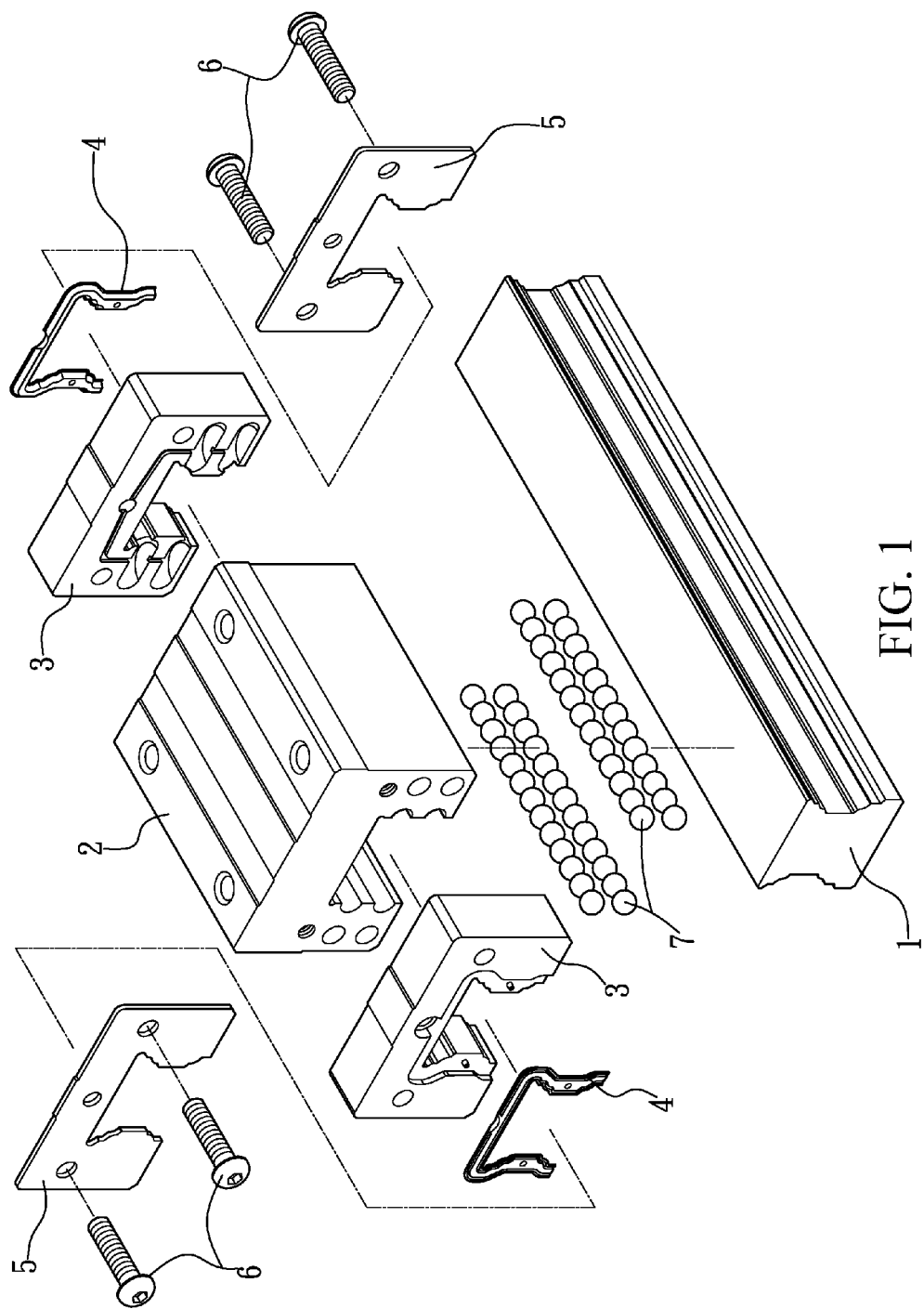
FIG. 1 is an exploded view showing a linear slide with dust protection plate according to the present invention.
Figure 2:
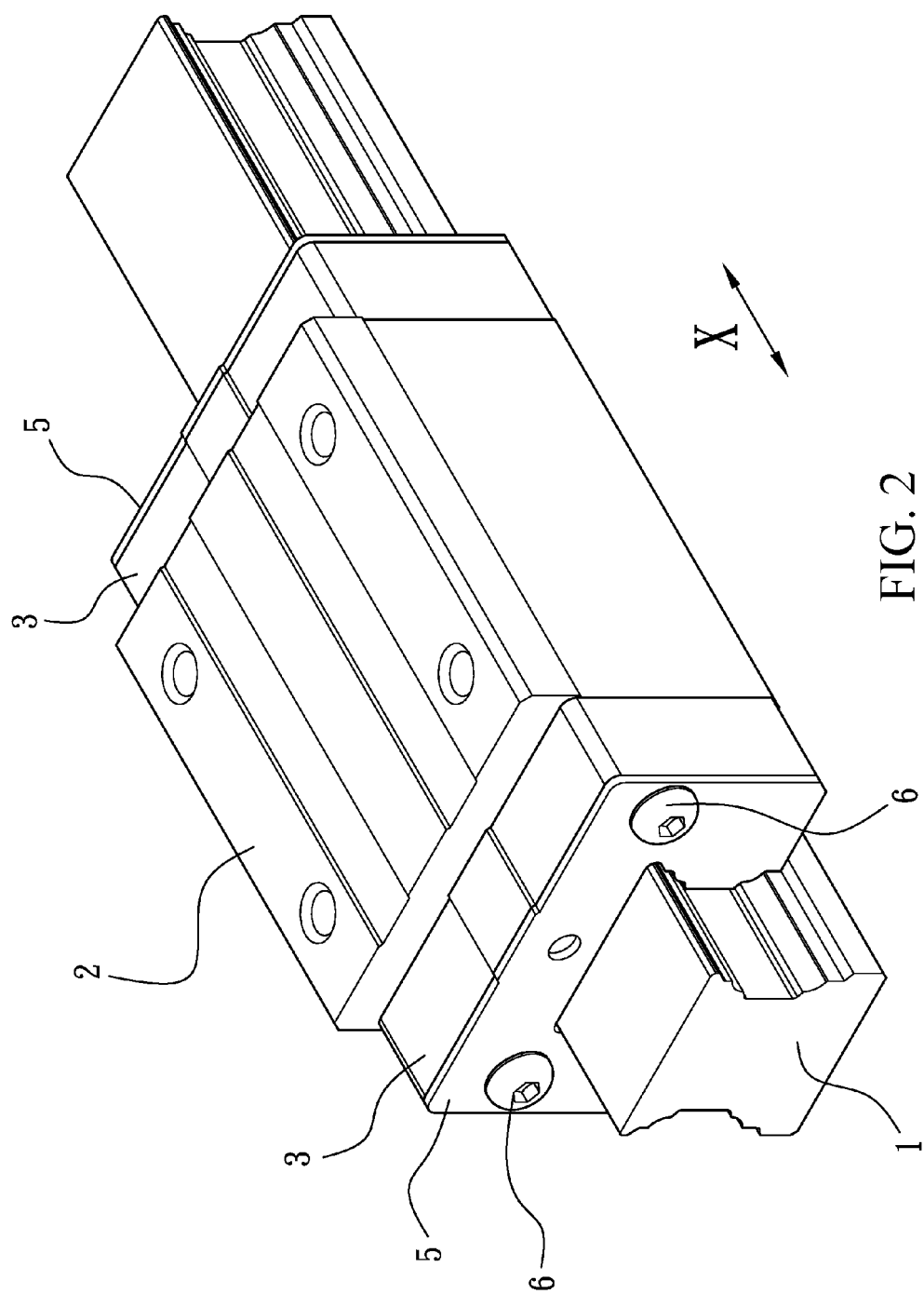
FIG. 2 is a perspective view showing the linear slide with dust protection plate according to the present invention in an assembled form.
Figure 3:
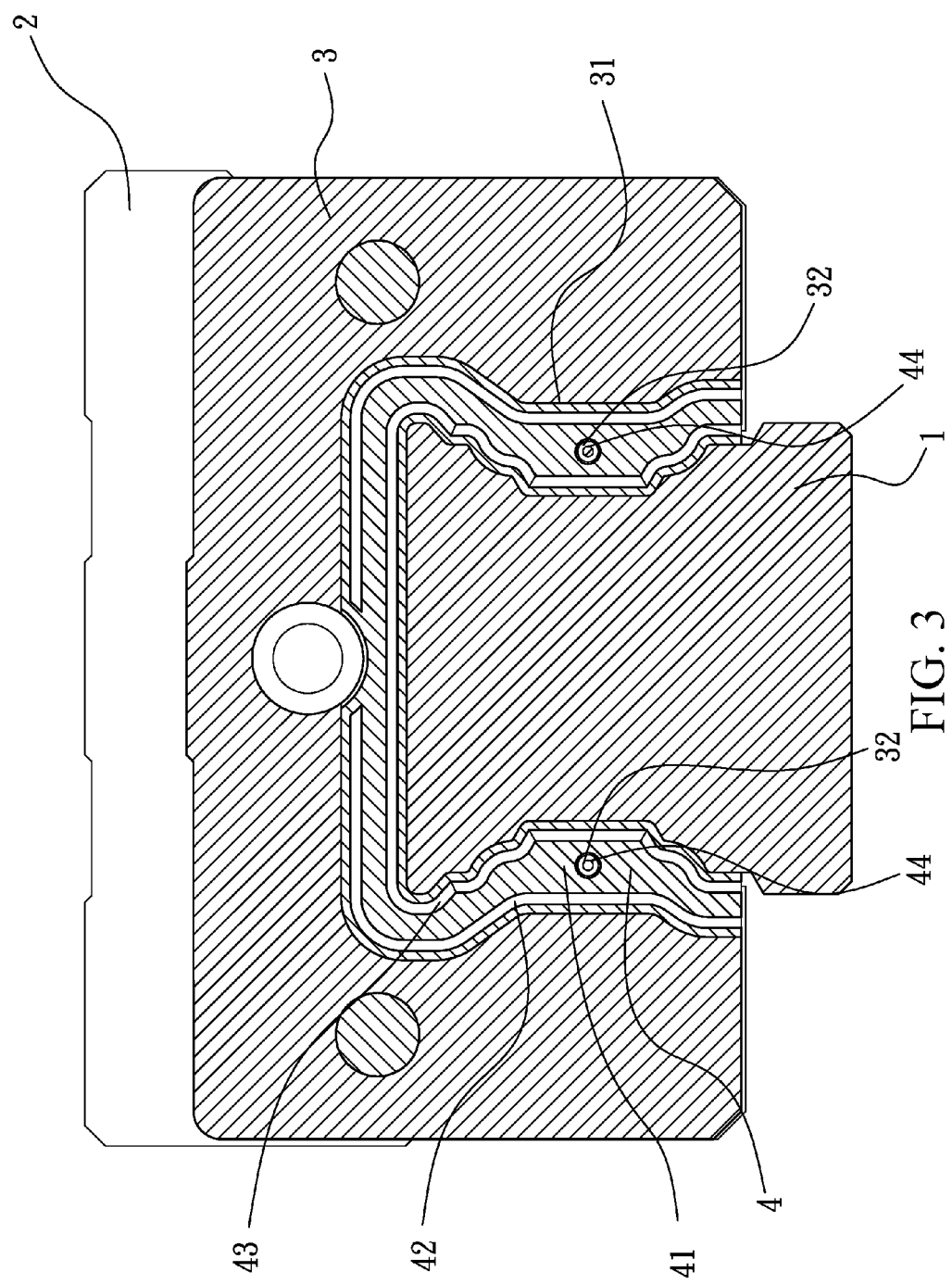
FIG. 3 is a cross-sectional view showing the linear slide with dust protection plate according to the present invention.
Figure 4:
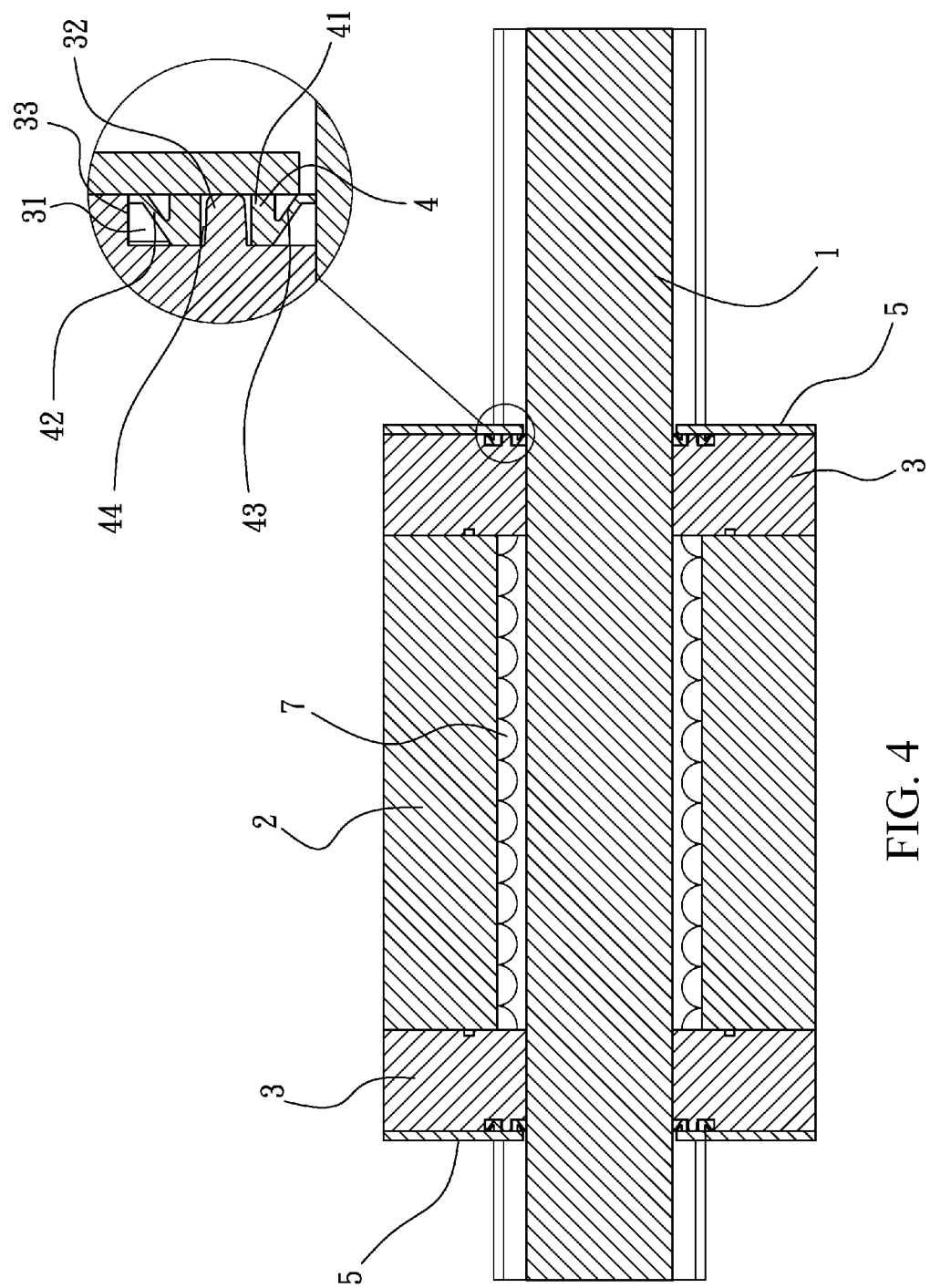
FIG. 4 is another cross-sectional view showing the linear slide with dust protection plate according to the present invention.
Figure 5B:
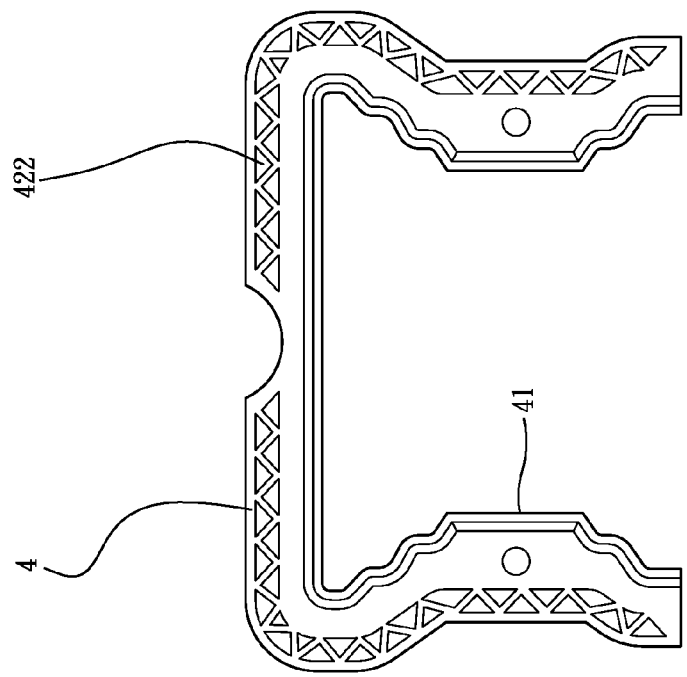
FIG. 5B shows an example of a dust protection plate according to the present invention.
Figure 5A:
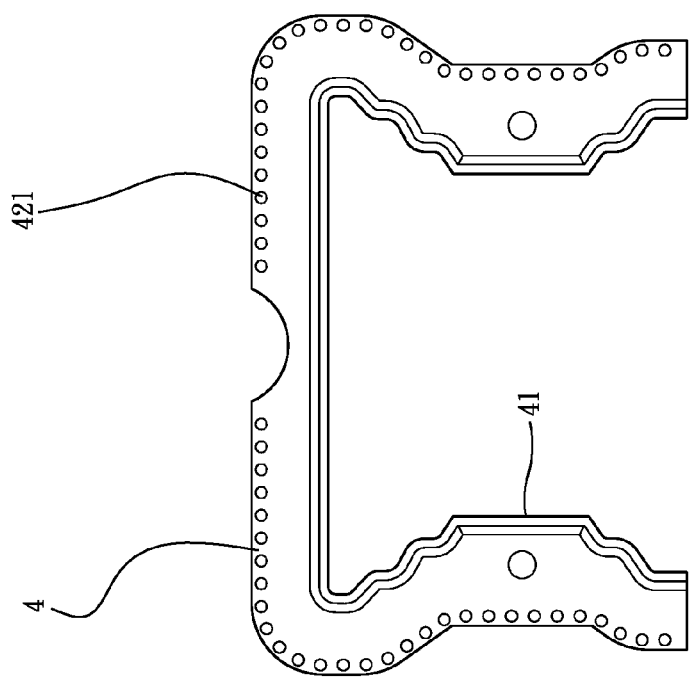
FIG. 5A shows an example of a dust protection plate according to the present invention.
Figure 5C:
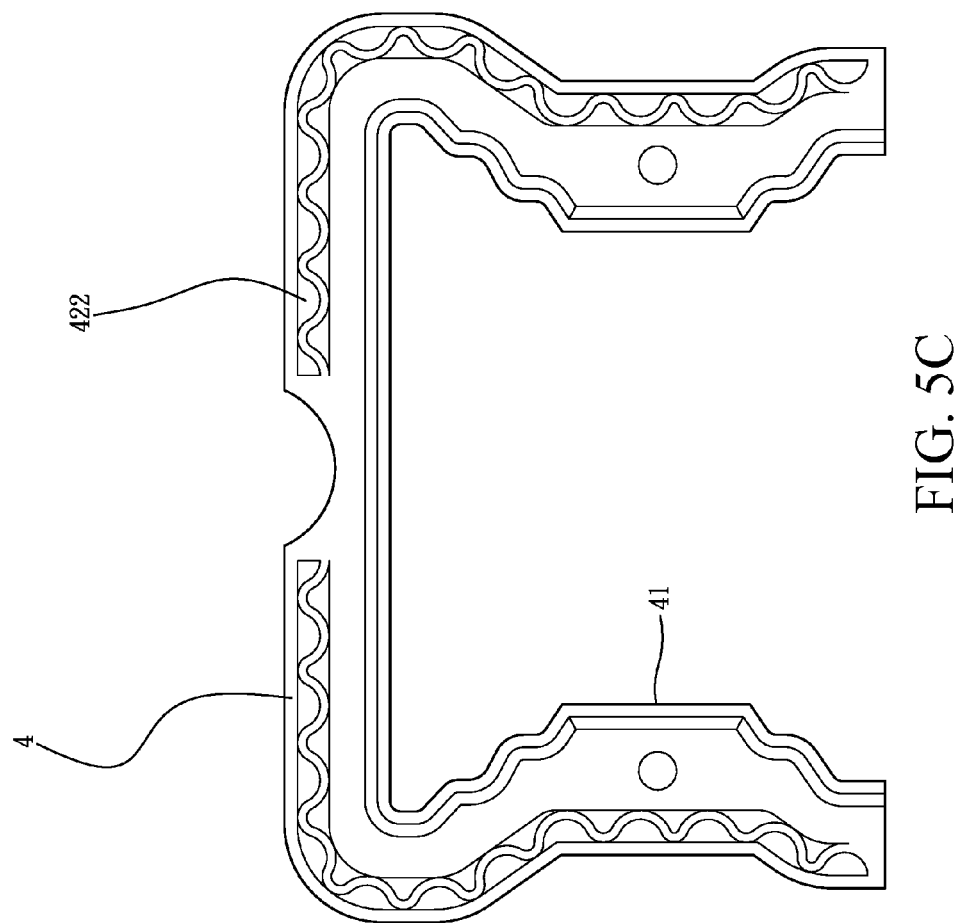
FIG. 5C shows an example of a dust protection plate according to the present invention.
Figure 6:
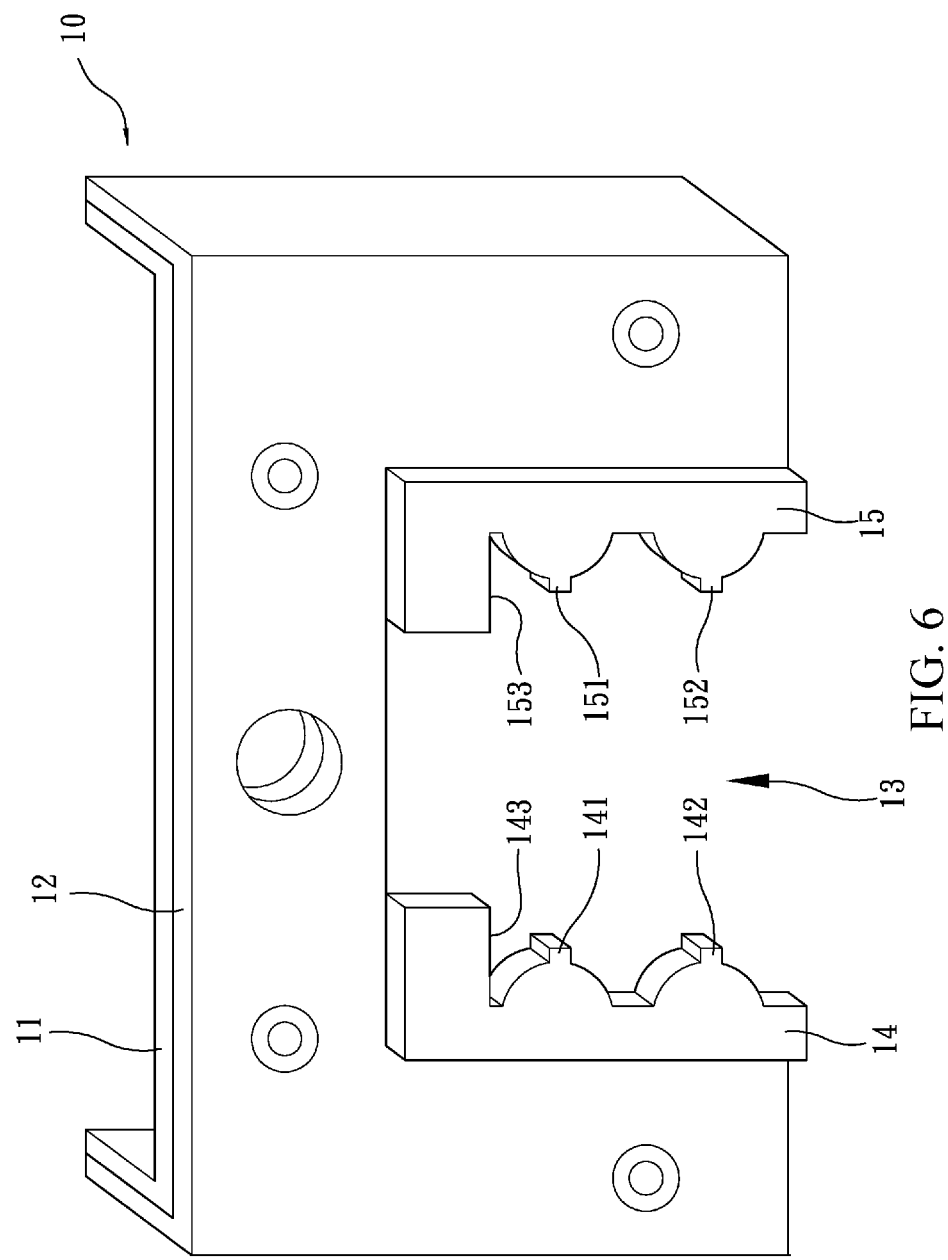
FIG. 6 is a perspective view illustrating a prior art dust protection plate.
Figure 7:
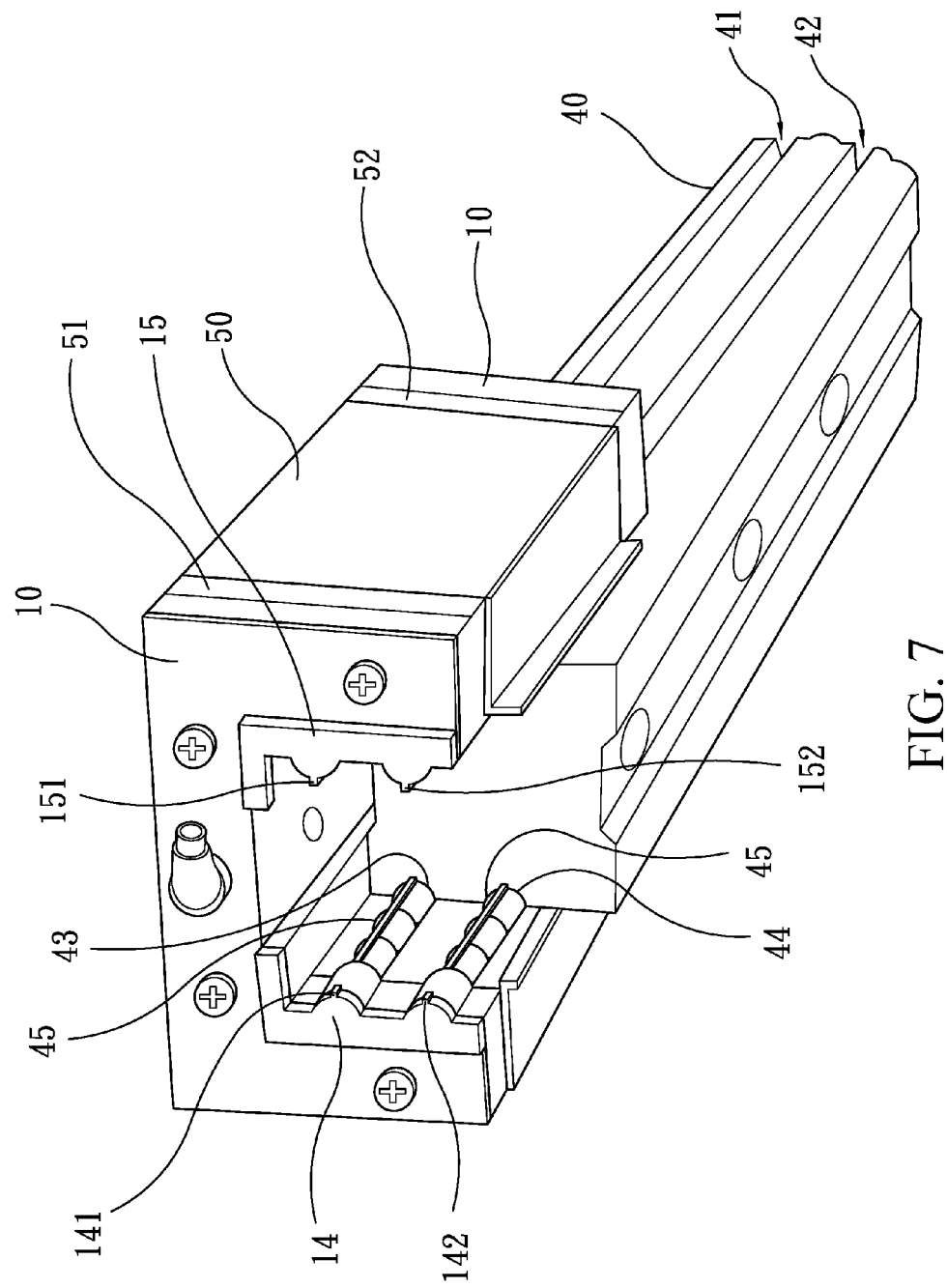
FIG. 7 is a perspective view showing a prior art linear slide with dust protection plate in an assembled form.

Referring to FIGS. 1-5, the present invention provides a linear slide with dust protection plate, which comprises: a rail (1); a slide block (2), which is mounted on the rail (1) and is movable relative to the rail (1); a plurality of rolling elements (7), which are arranged between the rail (1) and the slide block (2); two end caps (3), which are respectively mounted to two opposite ends of the slide block (2), the end caps (3) each comprising a mounting trough (31) formed therein to correspond to and face the rail (1), the mounting trough (31) having a wall (33) opposite to the rail; and two dust protection plates (4), each of which is arranged in each of the mounting troughs (31), each of the dust protection plates (4) comprising a main body (41) and two elastic sections (42, 43) projecting sideways from two opposite sides of the main body (41) such that one of the elastic sections, which is the elastic section (42) in this example, is set in continuous and sustained contact engagement with the wall (33), while the other one of the elastic sections, which is the elastic section (43) in this example, is set in continuous and sustained contact engagement with a surface of the rail (1). In the instant embodiment, the mounting troughs (31) and the dust protection plates (4) are both of a U-shape; however, each of the mounting troughs or any one of the mounting troughs can be divided into two or three independent, perhaps separate, segments and the dust protection plate corresponding to the multiple-segment mounting trough is divided into two or three segments respectively corresponding to and arranged in the segments of the mounting trough. In the instant embodiment, the mounting troughs (31) are each provided a positioning section (32) formed therein and the positioning section (32) in this example is a projecting pillar. Each of the dust protection plates (4) is provided with a positioning hole (44) corresponding to the positioning section (32) and the positioning hole (44) is fit over the positioning section (32). Preferably, loose fitting is adopted and a gap is provided between the positioning hole (44) and the positioning section (32) to allow for minor displacement of the dust protection plate (4) in any desired direction. To improve the strength of the elastic sections (42, 43), particularly for a large-sized dust protection plate (4), a plurality of apertures (421) may be formed between the elastic sections (42, 43) and the main body (41), as shown in FIG. 5A, or alternatively, a plurality of ribs (422) are used, where the ribs (422) can be of a wavy shape or comprise successively arranged V-shape, as shown in FIGS. 5C and 5B. In the instant embodiment, only the elastic section (42) is modified in this way, just to illustrate an example; however, the other elastic section (43) may also be modified to include a plurality of apertures or ribs in the same way. The two end caps (3) are each provided with and covered by a fixing plate (5), such that the fixing plate (5) constrain the degree of freedom of the corresponding dust protection plate (3) in an axial direction (X) to prevent the dust protection plate (4) from undesirably detaching from the mounting trough (31). The fixing plate (5) is fixed by a plurality of screws (6) to the end cap (3).

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A linear slide, comprising: a rail; a slide block, which is mounted on the rail and is movable relative to the rail; a plurality of rolling elements, which are arranged between the rail and the slide block;

two end caps, which are respectively mounted to two ends of the slide block, the end caps each comprising a mounting trough formed therein to correspond to and face the rail, the mounting trough having a wall; and two dust protection plates, each of which is arranged in each of the mounting troughs, each of the dust protection plates comprising a main body and two elastic sections projecting from two opposite sides of the main body such that one of the elastic sections is in contact engagement with the wall and the other one of the elastic sections is engageable with a surface of the rail, wherein a plurality of ribs are formed between at least one of the elastic sections and the main body of each of the dust protection plates.

2. The linear slide according to claim 1, wherein the mounting troughs and the dust protection plates are of a U-shape.

3. The linear slide according to claim 1, wherein the mounting troughs are each provided with a positioning section formed therein and the dust protection plates are each provided with a positioning hole corresponding to the positioning section such that the positioning hole is fit over the positioning section.

4. The linear slide according to claim 1, wherein the two end caps are each mounted to and covered by a fixing plate such that the fixing plate constrains a degree of freedom of the dust protection plate in an axial direction.

5. The linear slide according to claim 1, wherein the elastic sections of each of the dust protection plates are set in continuous and sustained contact engagement with the wall or the surface of the rail.

* * * * *